United States Patent [19]

Taylor et al.

[11] Patent Number: 4,909,133
[45] Date of Patent: Mar. 20, 1990

[54] LIGHTWEIGHT PISTON ARCHITECTURE

[75] Inventors: Allan H. Taylor, Newport News; Philip O. Ransone, Hayes, both of Va.

[73] Assignee: The United States of America as represented by the Administrator of the National Aeronautics and Space Administration, Washington, D.C.

[21] Appl. No.: 250,469

[22] Filed: Sep. 28, 1988

[51] Int. Cl.4 .................................................. F16J 1/04
[52] U.S. Cl. ........................................ 92/212; 92/213; 92/222; 92/248; 123/193 P; 29/888.046
[58] Field of Search ................. 92/212, 213, 222, 248, 92/224, 214; 123/193 P; 29/156.5 R

[56] References Cited

U.S. PATENT DOCUMENTS

| | | | |
|---|---|---|---|
| 4,187,932 | 2/1980 | Zarembka | 188/73.2 |
| 4,216,682 | 8/1980 | Ban et al. | 29/156.5 R |
| 4,306,489 | 12/1981 | Driver et al. | 92/212 |
| 4,329,915 | 5/1982 | Schulz | 92/212 |
| 4,341,830 | 7/1982 | Betts et al. | 428/65 |
| 4,354,804 | 10/1982 | Cruzen | 416/230 |
| 4,363,602 | 12/1982 | Martin | 416/230 |
| 4,440,069 | 4/1984 | Holtzberg et al. | 92/224 |
| 4,449,447 | 5/1984 | Yanagi | 92/248 |
| 4,450,610 | 5/1984 | Schäper | 29/156.5 R |
| 4,466,399 | 8/1984 | Hinz et al. | 29/212 |
| 4,518,640 | 5/1985 | Wilkins | 428/102 |
| 4,651,631 | 3/1987 | Avezou | 29/156.5 R |
| 4,679,493 | 7/1987 | Munro et al. | 92/213 |
| 4,683,809 | 8/1987 | Taylor | 92/208 |
| 4,683,810 | 8/1987 | Afimiwala | 92/212 |
| 4,736,676 | 4/1988 | Taylor | 92/212 |

FOREIGN PATENT DOCUMENTS 2912786 12/1986 Fed. Rep. of Germany .
0238039 10/1987 Japan ............................ 29/156.5 R Primary Examiner—Edward K. Look
Assistant Examiner—Thomas Denion
Attorney, Agent, or Firm—George F. Helfrich; John R. Manning; Charles E. B. Glenn

[57] ABSTRACT

The invention is an improvement in a lightweight carbon-carbon composite piston, the improvement comprehending the use of near-net shape knitted or warp-interlock pre-forms to improve the structural qualities of the piston. In its preferred embodiment, a one piece, tubular, closed-ended, knitted pre-form (a sock) of carbon fibers (11) embedded within the matrix of the piston structure forms the crown (12), side wall (15), skirt (16) and inner surface (18) of the piston, and wrap-interlock pre-forms strengthen the piston crown and wrist pin bosses.

4 Claims, 1 Drawing Sheet

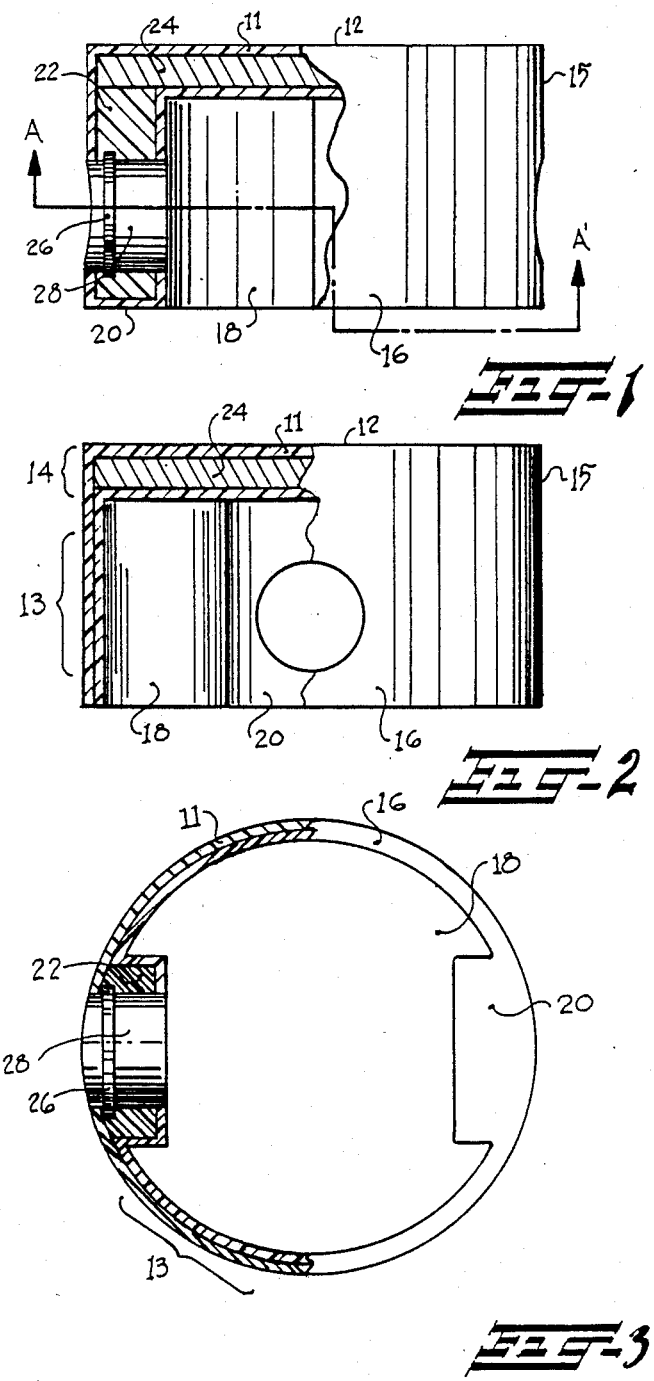

LIGHTWEIGHT PISTON ARCHITECTURE

ORIGIN OF THE INVENTION

The invention described herein was made by employees of the United States Government and may be used by or for the Government for governmental purposes without payment of any royalties thereon or therefor.

TECHNICAL FIELD OF THE INVENTION

The invention relates to lightweight piston design, and more specifically to an improved structure for a carbon-carbon composite piston.

BACKGROUND OF THE INVENTION

Pistons for use in high performance internal combustion engines must be light in weight, resistant to high temperatures and strong. Carbon-carbon composite materials are tough, light, resistant to heat and have low coefficients of friction and thermal expansion. The demands of piston design and the qualities of carbon-carbon composites are therefore compatible as evidenced by structures such as those described in U.S. Pat. No. 4,683,809.

One parameter affecting several of the structural qualities of carbon-carbon composite is fiber orientation. When the composite structure is composed of randomly directed fibers (mat or N-D structure) the qualities thereof vary as fiber length and homogeneity vary. Failure to adequately control these additional parameters can induce errors which will negatively influence structural strength and consistency of manufacturing results.

When a composite structure is composed of randomly directed fibers, there is no way to increase strength in a specific area to accomodate localized stresses except to thicken the structure. This exacts a serious penalty in increased weight. Alternatively, the selective orientation of fibers prior to their embedding in the matrix serves to reinforce orientation of fibers prior to their embedding in the matrix serves to reinforce high-stress areas without greatly increasing overall weight.

Carbon-carbon composite structures are relatively expensive to form because of the high raw material costs of certain components such as polyacrilonitrile (PAN), plus the lengthy and energy intensive re-impregnation and re-pyrolization steps required to obtain a structure of sufficient strength and density to withstand the operating environment inside an internal combustion engine. The time required to complete this densification process increases exponentially as the sectional thickness of the composite structure increases.

Using a knitted fiber architecture, which enables the fiber directions to be controllable, results in increased and better controlled interlaminar strength properties than cloth or mat layups. Consequently, the increased strength realizes significant savings from more economical use of materials, decreased difficulty of machining, shorter fabrication times, and reduced energy consumption.

Therefore, an object of the present invention is to increase the strength per unit weight of a carbon-carbon composite piston by using knitted or warp-interlock pre-forms of structural shapes to control internal fiber orientation.

An additional object is to reduce manufacturing costs for a carbon-carbon composite piston by the use of near net shape knitted or warp-interlock pre-forms so as to reduce lay-up, material and molding expenses.

An additional object is to reduce manufacturing time and expense for a carbon-carbon composite piston by decreasing component thickness and thereby shortening the densification processes.

BRIEF SUMMARY OF THE INVENTION

According to the invention, the foregoing and additional objects are attained by an improvement in prior lightweight piston art, with the improvement comprising the replacement of a woven fiber structure with the use of a knitted carbon fiber structure selectively reinforced with directionally oriented fiber structural shapes.

In the preferred embodiment, the generalized form of the invention is realized as a closed-end tube or sock of knitted carbon fibers which is imbedded in the matrix of the composite structure so as to form the crown, side wall, skirt and inside surface of a piston. Additional pre-formed crown and wrist pin boss reinforcements of warp interlocked cabon fibers are added to strengthen these high stress areas.

BRIEF DESCRIPTION OF THE DRAWINGS

FIG. 1 is a side view of a carbon-carbon composite piston according to the present invention showing a longitudinal cross section through the wrist pin boss and crown.

FIG. 2 is a side view of a carbon-carbon composite piston according to the present invention showing a longitudinal cross section through the piston skirt, side wall and crown.

FIG. 3 is a bottom view of a carbon-carbon composite piston according to the present invention taken along line A—A' of FIG. 1 showing a lateral cross section through the wrist pin boss and piston skirt.

DETAILED DESCRIPTION OF THE INVENTION

The invention comprises an improvement in the structure of lightweight carbon-carbon composite pistons for use in internal combustion engines. U.S. Pat. No. 4,683,809 by Taylor discloses details of the method of molding, curing and densification, including details of materials and processes to be used in conjunction with this improvement. The essence of the present invention is the use of knitted or warp interlock pre-forms which are embedded in the composite matrix so as to comprise structural components of the completed piston. The particular quality which the knitting and warp-interlock fabrication methods have in common is that when thay are used to manufacture components for composite structures, the orientation of the fibers in them are more controllable than the orientation of the fibers in a mat-type layup. By controllable orientation is meant the pre-planning of how the fiber bundles will run in the completed composite material, thereby giving the pre-forms tailorable mechanical qualities dependent upon their geometry.

When the pre-forms have been fabricated into the shape of the piston structure by methods such a knitting or warp interlock, they are then impregnated with a carbonaceous resin system such as furfuryl alcohol, and laid in a compression mold. Subsequent curing and densification is carried out by processes standard in the art of carbon-carbon composite materials such as pressure infiltration or carbon vapor deposition (CVD).

Referring now to FIGS. 1, 2 and 3, the present invention is shown in the preferred embodiment, which comprises a one piece, tabular, closed-ended, knitted preform (a sock) of carbon fibers (11) used to form the crown (12), side wall (14), skirt (16) and inner surface (18) of a lightweight carbon-carbon piston. The sock is impregnated with a suitable carbonaceous resin system (e.g., furfuryl alcohol), and then the closed end is inserted into an outer die which forms the outside surface of the piston. Next the crown reinforcement (24) and wrist pin boss reinforcemens (22) are resin impregnated and inserted into the interior of the sock as it lies in the outer die. This material can be unidirectional fibers as described in U.S. Pat. No. 4,683,809 or may be knitted or warp-interlock preforms as disclosed herein. Finally, the open end of the sock is folded inward, and arranged within the outer die so as to cover all reinforcing pieces. In this configuration it then forms the inner surface (18) of the piston, the shape of which is defined by the inner die which applies pressure for consolidation of the composite materials during curing. After initial curing, removal from the dies and pyrolyzation, the composite structure is relatively porous and must be densified before use. This can be effectively accomplished by two cycles of pressure infiltration and re-pyrolyzation with carbonaceous resin, followed by a final step of CVD.

Because of the shape of the sock and its orientation within the inner and outer dies, a near-net shape form is obtained and very little machining of the finished piston is required. Generally this is limited to boring wrist pin holes (28) in the wrist pin bosses (20), cutting retaining clip grooves (26) and final surface grinding of the outer circumferential surface (15). Additionally, the elimination of piston rings allows the skirt (13) of the piston to be short and thin. The knitted architecture, which inherently uses a continuous filament to form a compliant preform, conforms more readily to a complex piston shape than a woven architecture. Moreover, the knitted structure has much greater strength than woven structures, and is further strengthened by directionally oriented fiber structural shapes within the carbon-carbon composite. The combination of all of these design advantages allows the piston structure to be very thin in most spots, concomitantly reducing overall cost, weight and densification times.

As described in U.S. Pat. No. 4,683,809, the properties of carbon-carbon can eliminate the necessity for sealing piston rings in some applications. Conversely, although no piston ring grooves are displayed in the figures, it is understood that ringed pistons could be manufactured without departing from the practice of this invention.

Optimum qualities of molded carbon-carbon composities are obtained when subsequent machining steps avoid cutting the embedded fibers. Therefore, the dies for forming the piston should be slightly undersized and the densification steps should deposit sufficient resin to allow for finishing the outer surface of the piston without cutting the sock fibers. For this reason, also, better results are obtained if an oversized wrist pin hole is formed in the piston after the initial cure so that subsequent densification steps can re-imbed the cut fiber ends in this region and the final finishing of the wrist pin bearing surface can be carried out without exposing cut fiber ends.

Although specific embodiments of the invention have been described herein, they are to be considered exemplary of the novel features thereof and are not exhaustive. There are obviously many variations and modifications of these specific examples that will be readily apparent to those skilled in the art in light of the above teachings without departing from the spirit or scope of the appended claims. It is, therefore, to be understood that the invention may be practiced otherwise than is specifically described.

What is claimed as new and desired to be secured by Letters Patent of the United States is:

1. In combination with a lightweight piston having a crown, side wall, skirt, inner surface and a reinforced wrist pin boss area, said lightweight piston being composed of carbon-carbon composite, the improvement which comprises a one-piece, closed-end, single knitted fiber structural shape forming an exterior surface of the carbon-carbon composite, said knitted structural shape forming the crown, side wall, skirt and inner surfaces of the piston.

2. A lightweight piston as in claim 1 wherein the improvement comprises directionally oriented fiber structural shapes within the carbon-carbon composite to improve the mechanical properties of the piston.

3. A lightweight piston as in claim 1 wherein the improvement comprises a selective reinforcement of the wrist pin boss area with a warp-interlock fiber shape formed to near-net shape dimensions prior to its imbedding within the carbon-carbon composite.

4. A lightweight piston as in claim 1 wherein the improvement comprises a selective reinforcement of the piston crown with a warp-interlock fiber shape formed to near-net shape dimensions prior to the embedding thereof within the carbon-carbon composite.

* * * * *